June 16, 1925.
J. CARLSON
CLOTHESLINE REEL
Filed Jan. 19, 1922
1,542,435
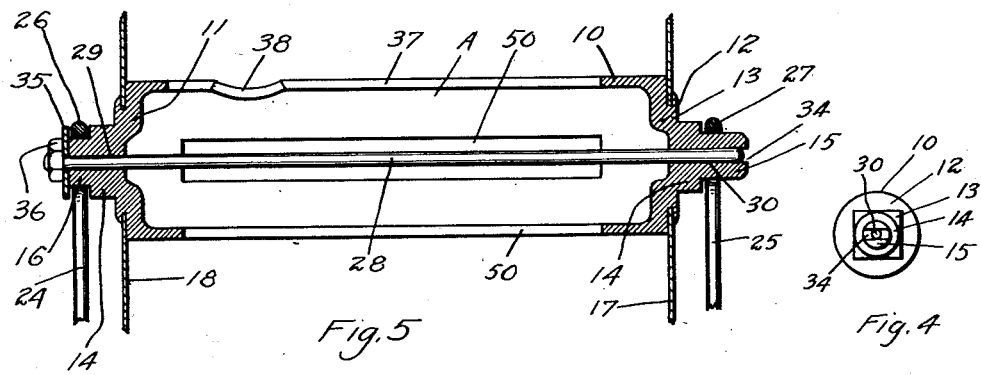
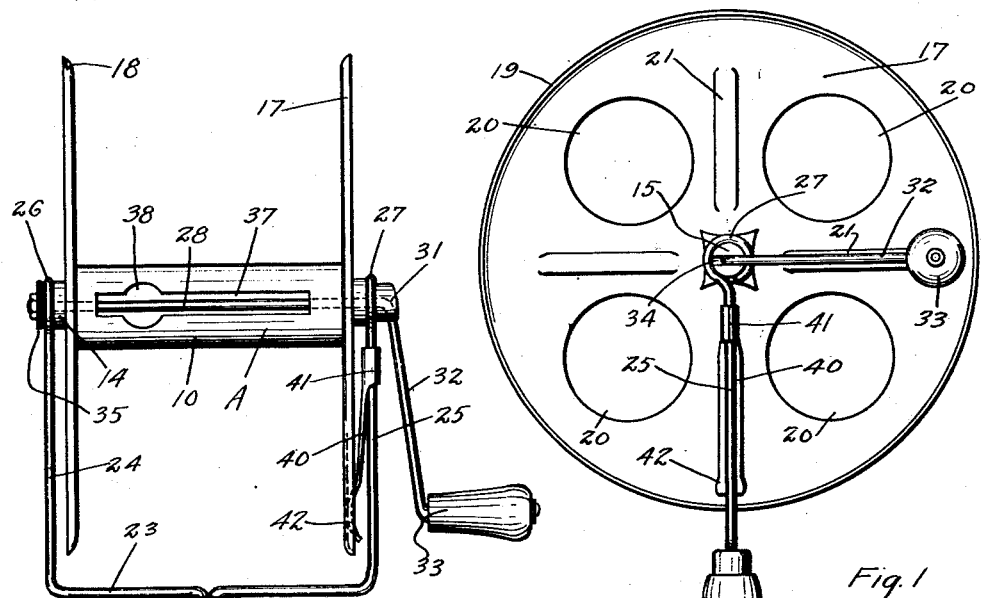
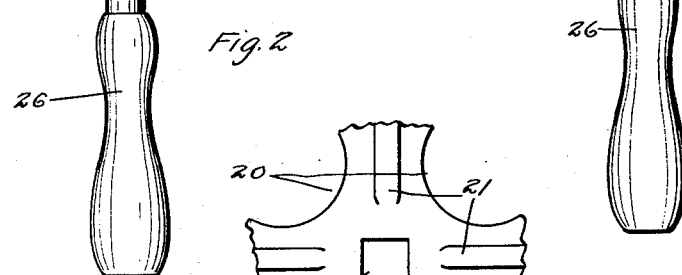
Inventor:
John Carlson
By Herman Riche
his Attorney Patented June 16, 1925.                                    1,542,435

UNITED STATES PATENT OFFICE.

JOHN CARLSON, OF ST. PAUL, MINNESOTA, ASSIGNOR TO ARLINGTON MACHINE WORKS, INC., OF ST. PAUL, MINNESOTA.

CLOTHESLINE REEL.

Application filed January 19, 1922. Serial No. 530,256.

*To all whom it may concern:*

Be it known that I, JOHN CARLSON, a citizen of the United States, residing at St. Paul, in the county of Ramsey and State of Minnesota, have invented a new and useful Improvement in Clothesline Reels, of which the following is a specification.

My invention relates to clothes line reels and has for its object to provide a device readily adapted to be used for coiling clothes lines or similar ropes by hand and for holding the same in place thereon.

Another object is to provide a U-shaped handle between the arms of which is pivoted the reel proper, the reel proper having a handle issuing outwardly from the same.

Another object is to form the drum of the reel hollow and to provide the same with a longitudinal slot having an enlarged opening through which a knot on the end of the clothes line may be inserted to secure the said clothes line to the drum.

Another object is to provide the reel heads with square holes through which are adapted to be inserted square shanks formed on the end of the drum which shanks may be riveted over at the corners to securely hold the reel heads in place upon the drum.

A still further object is to provide the reel drum with a longitudinal bore and a transverse slot formed at one end of the same through which a bent wire member serving as a handle is adapted to pass, said member being held from rotation relative to said drum thereby.

A still further object is to provide a fastening means upon the protruding end of said bent wire handle which serves to hold the U-shaped handle attached to the drum.

A still further object is to provide a retarding member for frictionally engaging the side of one of the reel heads to prevent the reel from uncoiling and unwinding the rope when the same is not desired.

The full objects and advantages of my invention will appear in connection with the detailed description thereof and are particularly pointed out in the claims.

In the drawings, illustrating the application of my invention in one form:—

Fig. 1 is a side view of my invention.

Fig. 2 is a front view of the same.

Fig. 3 is a side view of a portion of one of the reel heads.

Fig. 4 is an end view of the reel drum prior to the attachment of the reel heads and handle thereto.

Fig. 5 is a cross sectional view taken through the center of the reel and drawn to an enlarged scale.

My invention as best shown in Figure 5 comprises a reel drum indicated at its entirety at A, which consists of a hollow cylindrical section 10 formed with end walls 11 and 12. These end walls are provided with squared shanks 13 issuing outwardly therefrom as best shown in Figure 4. Attached to the shanks 13 are cylindrical hubs 14 from which issues stub shafts 15 and 16.

Upon the ends of the reel drum A are mounted two reel heads 17 and 18, the construction of which is best disclosed in Figures 1 and 3. These reel heads are preferably formed disk-shaped and are provided with an outwardly turned flanged edge 19 for stiffening and forming a rigid structure of the same. To reduce the weight of these heads a number of holes 20 are cut through the same. The metal between these holes is stiffened by means of a number of ribs 21 which are radially positioned relative to the device. At the geometric center of these disks are provided square holes 22 which are best shown in Fig. 3.

The manner of attachment of the heads 17 and 18 upon the drum A can best be comprehended from Figures 1 and 5. The holes 22 formed in the reel heads 17 and 18 are of such a size as to just fit over the square shanks 13 formed on the ends of the said drum. The length of these shanks is somewhat greater than the thickness of the reel heads so that the same project outwardly beyond the surface of the said heads. By riveting the corners of the shanks 13 outwardly the metal comprising said shank is caused to flow outwardly beyond the edge of said heads 17 and 18 and to over-lap the same thereby securely holding the said reel heads in place upon the drum so as to prevent rotational movement thereof.

For supporting the reel I provide a U-shaped wire supporting member 23 which is formed with two arms 24 and 25 and which is attached at its center to a supporting handle 26. The arms 24 and 25 are provided with looped ends 26 and 27 which are adapted to pass around the stub shafts 15 and 16, thus providing bearings in which the entire reel is adapted to rotate.

The device for rotating the reel consists of a wire member 28 which passes directly through two holes 29 and 30 drilled through the ends of the drum proper. Wire member 28 is bent at 31 to form a crank portion 32 which has rotatably mounted upon the end of the same an operating handle 33. The extreme end of the stub shaft 15 which extends beyond loop 27 as clearly shown in Figure 5, is formed with a transverse slot 34 extending across the same, which communicates with the hole 30 drilled through the end of drum A. The crank portion 32 of wire member 28 is adapted to lie within said slot when the wire member 28 is properly positioned within the reel by means of which rotation of this device relative to the reel proper is prevented. For securing said wire member 28 in place I employ a washer 35 and a nut 36 adapted to be attached to the end of the said wire member to rigidly clamp the same to the reel. If desired the extreme end of the wire member 28 may be riveted so as to prevent the unloosening of the nut 36. Washer 35 serves to hold wire member 24 from removal from the device thereby holding the U-shaped supporting member 23 properly attached to the reel.

For the attachment of the end of the clothes line to the reel I provide a longitudinal slot 37 which extends longitudinally throughout substantially the entire length of the drum A and which is of a width just great enough to permit the passage of an ordinary clothes line rope through the same. Near one end of slot 37 the same is enlarged as indicated at 38, through which enlargement a knot tied upon the end of the clothes line may be inserted. After the knot has been inserted into the hollow interior of the drum A, through the opening 38, the end of the clothes line may be slid along slot 37 to the opposite end thereof at which point the knot engages on the interior of said drum and prevents the removal of the said rope directly outwardly therefrom. In this manner the clothes line may be quickly and securely attached to the drum so that the same may be conveniently coiled upon the reel as required. To give symmetry and to reduce the weight of the hub A I provide additional slots 50 which are similar to the slot 37 and are positioned about the periphery of said hub.

To prevent accidental spinning of the reel and uncoiling of the rope when the same is not required, I provide a spring clip 40 which is bent around a portion of the arm 25 indicated at 41 to securely clamp the said clip in place. This clip is further formed with a portion 42 adapted to frictionally engage the surface of reel head 17 and to retard the rotational movement of the same in case the handle 33 is let go. The resiliency of spring 40 is not great enough to obstruct the movement of the handle 33.

The advantages of my invention are manifest. The device can be constructed at a very small cost and the parts are so held together that considerable force can be exerted upon the handle for rotating the reel so that the line can be coiled tightly upon the same. By the employment of the engaging member unintentional uncoiling of the reel is eliminated.

In accordance with the patent statutes I have described the principles of operation of my invention together with the apparatus which I now consider to represent the best embodiment thereof, but I desire to have it understood that the construction shown is only illustrative and that the invention can be carried out by other means and applied to uses other than those above set forth within the scope of the following claims:

I claim:—

1. A reel comprising a cylindrical drum having planiform ends, square shanks issuing outwardly from the faces of said ends, reel heads having openings corresponding to said shanks adapted to be placed over the same and seated against said drum ends, the corners of said shanks being turned over to securely hold the reel heads in place.

2. A reel comprising a cylindrical drum, squared shanks issuing outwardly from the ends of said drum, hubs issuing outwardly from said shanks of a lesser diameter than said shanks, reel heads supported upon said shanks and a supporting member having bearings journalled upon said stub shafts.

3. A reel comprising a supporting member, a drum having a square shank, a hub issuing outwardly from said shank, a stub shaft issuing outwardly from said hub and journalled in said supporting member, said supporting member lying adjacent said hub, said shaft issuing outwardly beyond said supporting member, and a crank mounted in said drum and secured to said protruding end of said stub shaft for operating the reel.

4. A reel comprising a supporting member, a drum having a square shank, a hub issuing outwardly from said shank, a stub shaft issuing outwardly from said hub and journalled in said supporting member, said supporting member lying adjacent said hub, said shaft issuing outwardly beyond said supporting member, a transverse slot extending across said protruding shaft end, a crank mounted in said drum having a portion passing through said slot and held from movement thereby.

5. A reel comprising a drum formed with ends, stub shafts issuing outwardly from said ends, aligned holes extending through said ends and stub shafts, a transverse slot extending across one of said shaft ends, a wire member extending through said holes and having a portion bent over to pass through said slot, and means for holding said wire member in place within the hub.

6. A reel comprising a hollow drum, a longitudinal slot extending substantially throughout the length of said drum, oppositely facing curved notches formed in the edges of said drum adjacent said slot near one end thereof.

In testimony whereof I affix my signature.

JOHN CARLSON.